United States Patent
Scott et al.

(10) Patent No.: US 7,181,205 B1
(45) Date of Patent: Feb. 20, 2007

(54) I/Q CALIBRATION

(75) Inventors: Baker Scott, Boulder, CO (US); David Reed, Westminster, CO (US); Robert Grant Irvine, Greensboro, NC (US); Feng Wang, Jamestown, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 132 days.

(21) Appl. No.: 10/943,055

(22) Filed: Sep. 16, 2004

Related U.S. Application Data

(60) Provisional application No. 60/570,131, filed on May 11, 2004.

(51) Int. Cl.
*H04Q 7/20* (2006.01)

(52) U.S. Cl. .............. 455/423; 455/67.11; 455/67.14; 455/67.16

(58) Field of Classification Search .............. 455/423, 455/73, 67.11, 67.13, 67.14, 67.16, 226.1
See application file for complete search history.

(56) References Cited

U.S. PATENT DOCUMENTS

| | | | |
|---|---|---|---|
| 4,488,155 A * | 12/1984 | Wu .......................... 342/376 |
| 5,524,281 A * | 6/1996 | Bradley et al. .......... 455/67.15 |
| 5,982,427 A * | 11/1999 | Hunt et al. .................. 348/254 |
| 6,157,680 A * | 12/2000 | Betts et al. .................. 375/285 |
| 6,570,933 B1 | 5/2003 | Makinen ..................... 375/296 |
| 6,832,075 B1 * | 12/2004 | Henry, Jr. ................. 455/226.1 |
| 2002/0093385 A1 * | 7/2002 | Nishiyama et al. ........... 331/46 |
| 2003/0053563 A1 | 3/2003 | Mohindra .................... 375/324 |
| 2003/0094976 A1 * | 5/2003 | Miyashita .................... 327/40 |
| 2003/0142012 A1 * | 7/2003 | Hirabe ....................... 342/173 |
| 2004/0106380 A1 * | 6/2004 | Vassiliou et al. ............. 455/73 |
| 2004/0141567 A1 * | 7/2004 | Yang et al. .................. 375/287 |
| 2004/0252632 A1 * | 12/2004 | Bourdoux et al. .......... 370/210 |
| 2005/0221765 A1 * | 10/2005 | Shen et al. .................... 455/73 |

* cited by examiner

*Primary Examiner*—Jean Gelin
*Assistant Examiner*—Huy D Nguyen
(74) *Attorney, Agent, or Firm*—Withrow & Terranova, PLLC

(57) ABSTRACT

The amplitude and phase errors of the modulation and demodulation in a transceiver are corrected by a self-calibration procedure in which a test signal is applied to the baseband input of the transmitter, and the output of the modulator is looped back to the input of the demodulator. The amplitude and phase errors of the resulting signal at the baseband output of the receiver are detected, and the contributions of the transmitter and receiver to the errors are separated and resolved into amplitude and phase components. Adjustments are then made to the amplitude and phase balance in the transmit and receive signal paths to correct the errors.

38 Claims, 9 Drawing Sheets

I/Q CALIBRATION

CROSS-REFERENCE TO RELATED APPLICATIONS

This application claims the benefit of provisional patent application Ser. No. 60/570,131, filed May 11, 2004, the disclosure of which is hereby incorporated by reference in its entirety.

FIELD OF THE INVENTION

The present invention relates to a radio frequency (RF) transceiver, and more particularly relates to a calibration of a RF transceiver.

BACKGROUND OF THE INVENTION

In a radio-frequency transceiver, mismatches between in-phase (I) and quadrature (Q) baseband signal paths result in amplitude and phase errors that degrade the quality of the transmitted or received signal. In a transceiver without calibration, amplitude and phase errors up to 0.3 dB and 3°, respectively, can occur. This is acceptable for many radio frequency (RF) communication systems, such as wireless local area networks (LANs) based on the IEEE standard 802.11b. However, in order to achieve an acceptable error vector magnitude for the IEEE wireless LAN standards 802.11a and 802.11g, the transceiver must achieve $\leq 0.1$ dB amplitude error and $\leq 1°$ phase error, thereby requiring some form of calibration.

The amplitude and phase errors of an integrated transceiver can be corrected either by an end-of-line calibration or by self-calibration. End-of-line calibration is a one-time calibration performed at the end of the manufacturing process of the transceiver chip or of the circuit board on which it is mounted and generally requires the use of circuitry external to the transceiver. For self-calibration, the calibration is performed repeatedly throughout the operating lifetime of the transceiver chip or circuit board, and the entire calibration circuitry is on-chip. In addition to being either end-of-line calibration or self-calibration, calibration can be performed with either a continuous-wave (CW) signal or a modulated signal.

Compared to an end-of-line calibration, self-calibration has the advantages that the calibration does not increase the cost or duration of the manufacturing process or require additional equipment. In addition, self-calibration avoids the need for a non-volatile memory to store the calibration settings, and it automatically corrects any drift of the amplitude and phase errors during the operating lifetime of the transceiver.

In typical CW calibration procedures, the transmitter is calibrated by applying sinusoidal test signals of equal amplitude and frequency with a 90° phase difference to the baseband inputs of the transceiver, measuring the spectrum of the RF output signal, and adjusting the control inputs for the amplitude and phase balance so as to minimize the amplitude of the suppressed sideband. The receiver is calibrated in an analogous manner by applying a single tone, which is offset from the carrier frequency, to the RF input, measuring the relative amplitude and phase of the resulting sinusoidal signals at the baseband outputs, and adjusting the control inputs such that the amplitudes of the baseband outputs are equal and the phase difference between the baseband outputs is equal to 90°.

In this type of calibration, the control inputs are adjusted in an iterative manner, alternating between amplitude and phase adjustments, until the amplitude of the suppressed sideband at the transmitter output and the amplitude and phase errors at the receiver outputs are within defined limits. This technique becomes too complicated if separate adjustment of the baseband and carrier components of the phase error is needed to achieve desired accuracy. The complication arises from the fact that the measurement procedure must not only alternate between three control inputs (amplitude error, baseband phase error and carrier phase error), but also between upper-sideband (I leads Q) and lower-sideband (I lags Q) test signals.

In principle, after the transmitter is calibrated, the transmitter output could be used as the test signal for the receiver. However, any remaining errors in the transmitter would result in a residual unwanted sideband and degrade the calibration accuracy of the receiver. Thus, in practice, a separate, single-tone RF signal source is needed to calibrate the receiver by the method described above. For self-calibration, implementing such a source on-chip with the necessary frequency accuracy would require an additional phase-locked loop (PLL), which is undesirable.

Thus, there remains a need for a transceiver including self-calibration circuitry that shortens and simplifies the calibration procedure.

SUMMARY OF THE INVENTION

The amplitude and phase errors of the modulation and demodulation in a transceiver are corrected by a self-calibration procedure in which a test signal is applied to the baseband input of the transmitter, and the output of the modulator is looped back to the input of the demodulator. The amplitude and phase errors of the resulting signal at the baseband output of the receiver are detected, and the contributions of the transmitter and receiver to the errors are separated and resolved into amplitude and phase components. Adjustments are then made to the amplitude and phase balance in the transmit and receive signal paths to correct the errors.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
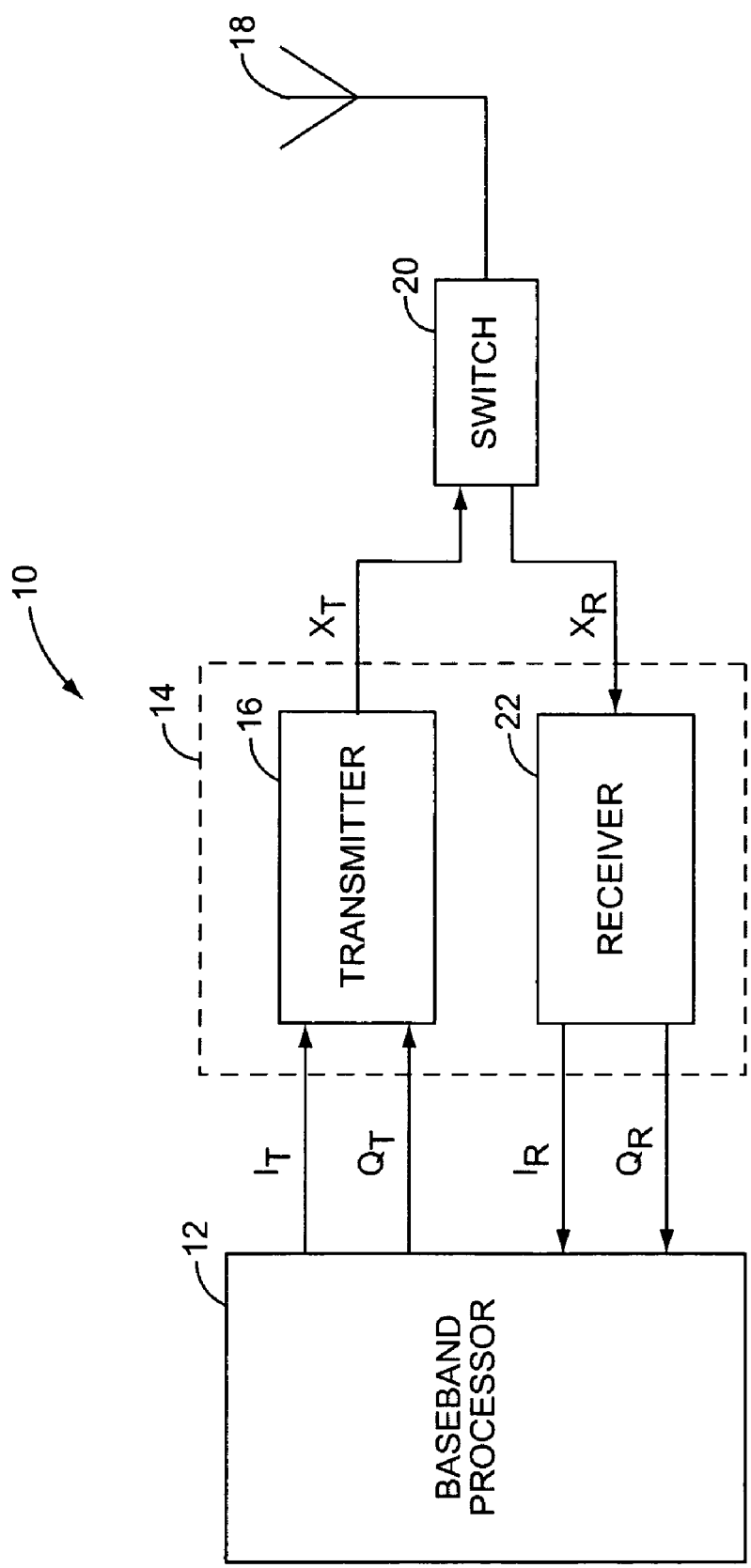
FIG. 1 illustrates a typical transceiver known in the art.

The present invention provides calibration for a radio frequency (RF) transceiver. Before further discussing the present invention, it is beneficial to discuss the inherent errors of a typical transceiver 10 illustrated in FIG. 1. The transceiver 10 can be partitioned into a baseband processor 12 and a radio section 14. In the radio section 14, a transmitter 16 receives baseband transmit signals ($I_T$ and $Q_T$) from the baseband processor 12 and outputs a corresponding RF transmit signal ($X_T$) to an antenna 18 via switch 20. The radio section also includes a receiver 22 that receives a received RF signal ($X_R$) from the antenna 18 and outputs corresponding baseband receive signals ($I_R$ and $Q_R$) to the baseband processor 12.

A modulated signal can be expressed as the weighted sum of two orthogonal carriers:

$$X(t)=I(t)\cos(\omega_c t)-Q(t)\sin(\omega_c t) \quad (1)$$

where $\omega_c$ is the carrier frequency, t is time, and the weighting functions I(t) and Q(t) are the orthogonal components of the baseband signal. In the transceiver 10, the transmitter 16 includes a modulator, which generates the transmit signal ($X_T$) from orthogonal baseband transmit signals ($I_T$) and ($Q_T$), and the receiver 22 includes a demodulator, which generates the orthogonal baseband receive signals ($I_R$) and ($Q_R$) from the received RF signal ($X_R$). Thus, for an ideal transceiver 10, $$X_T(t)=I_T(t)\cos(\omega_c t)-Q_T(t)\sin(\omega_c t) \quad (2)$$

$$X_R(t)=I_R(t)\cos(\omega_c t+\theta)-Q_R(t)\sin(\omega_c t+\theta) \quad (3)$$

where θ is a phase offset between the transmit and receive carriers $\omega_c$, which is unimportant in normal operation. For a non-ideal transceiver 10, $$X_T(t)=I'_T(t)\cos(\omega_c t)-Q'_T(t)\sin(\omega_c t) \quad (4)$$

$$X_R(t)=I'_R(t)\cos(\omega_c t+\theta)-Q'_R(t)\sin(\omega_c t+\theta) \quad (5)$$

where $I'_T$ and $Q'_T$ are the inputs to an ideal transmitter that would generate the same transmit signal ($X_T$) as the non-ideal transmitter 10, and $I'_R$ and $Q'_R$ are the outputs of an ideal receiver for the same received signal ($X_R$) as the non-ideal receiver 10. Deviations from ideal behavior are attributable partly to noise and non-linearity in the transceiver 10, and partly to other effects that are associated with mismatches between nominally identical sections of the signal path. The purpose of the invention is to correct the modulation and demodulation errors associated with such mismatches.

Figure 2:
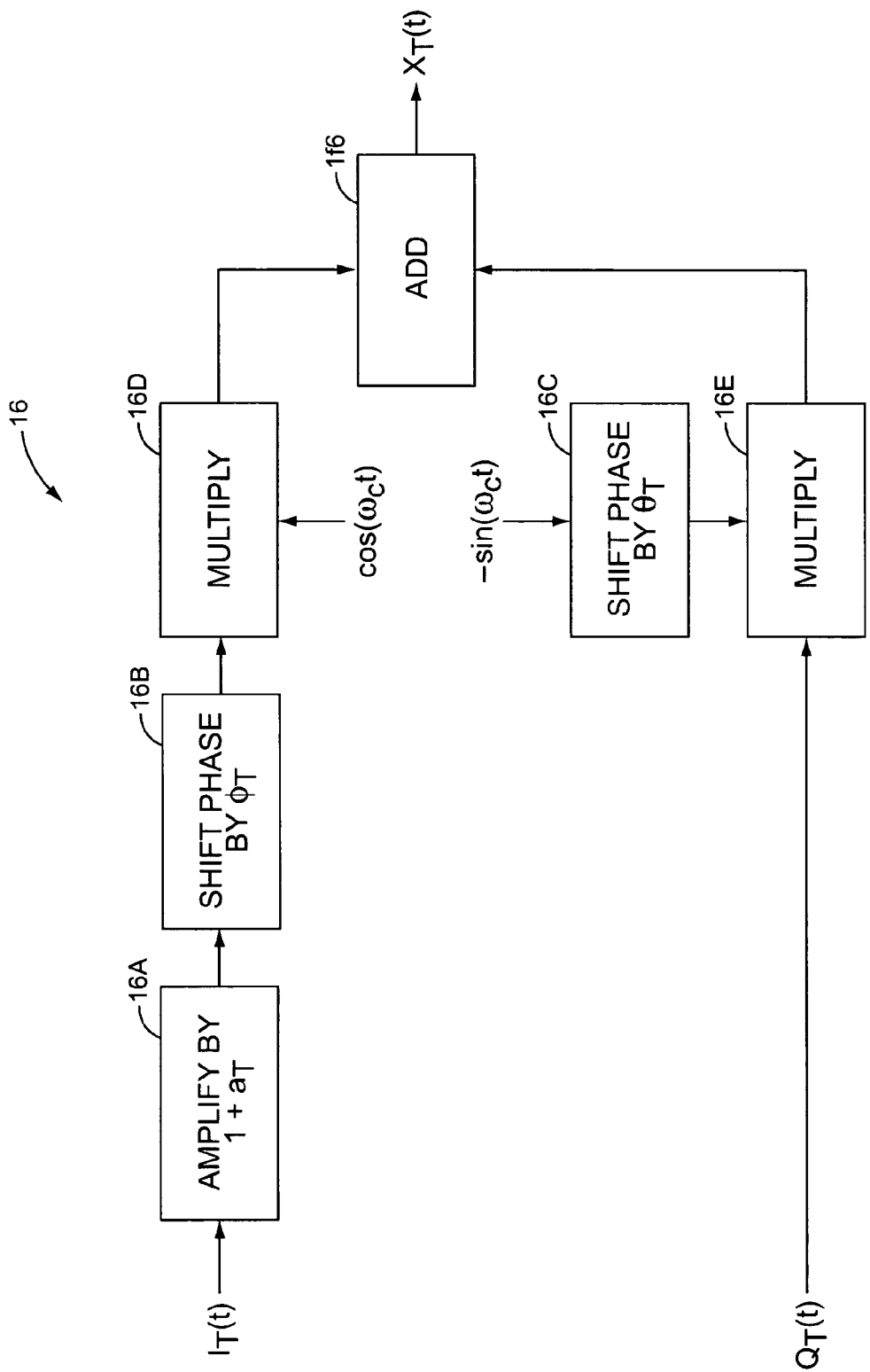
FIG. 2 is a block diagram illustrating amplitude and phase errors associated with the transmitter of the transceiver of FIG. 1.

The mismatch errors of the transmitter 16 occur only in the modulator and the stages preceding the modulator in the transmit signal path and can be represented as shown in FIG. 2. There are three distinct errors: an amplitude error $a_T$, which causes the baseband transmit signal ($I_T$) to be amplified by a factor $1+a_T$ relative to the baseband transmit signal ($Q_T$) (Block 16A), a baseband phase error $\phi_T$, which causes the baseband transmit signal ($I_T$) to be advanced in phase by $\phi_T$ relative to the baseband transmit signal ($Q_T$) (Block 16B), and a carrier phase error $\theta_T$, which causes the magnitude of the phase difference between the nominally orthogonal carriers to be $90°+\theta_T$ (Block 16C). Multiplication circuitries 16D and 16E operate to modulate the baseband transmits signals ($I_T$ and $Q_T$), and the modulated baseband signals are combined by adder 16F to provide the modulated transmit signal ($X_T$). If $$I_T=\cos(\omega_b t) \quad (6)$$

$$Q_T=\pm\sin(\omega_b t) \quad (7)$$

where $\omega_b$ is a constant, then $$I'_T\approx(1+a_T)\cos(\omega_b t+\phi_T\pm\theta_T) \quad (8)$$

$$Q'_T\approx\pm\sin(\omega_b t) \quad (9)$$

The baseband phase error $\phi_T$ and the carrier phase error $\theta_T$ add if the baseband transmit signal ($I_T$) leads the baseband transmit signal ($Q_T$), and subtract if $I_T$ lags $Q_T$.

Figure 3:
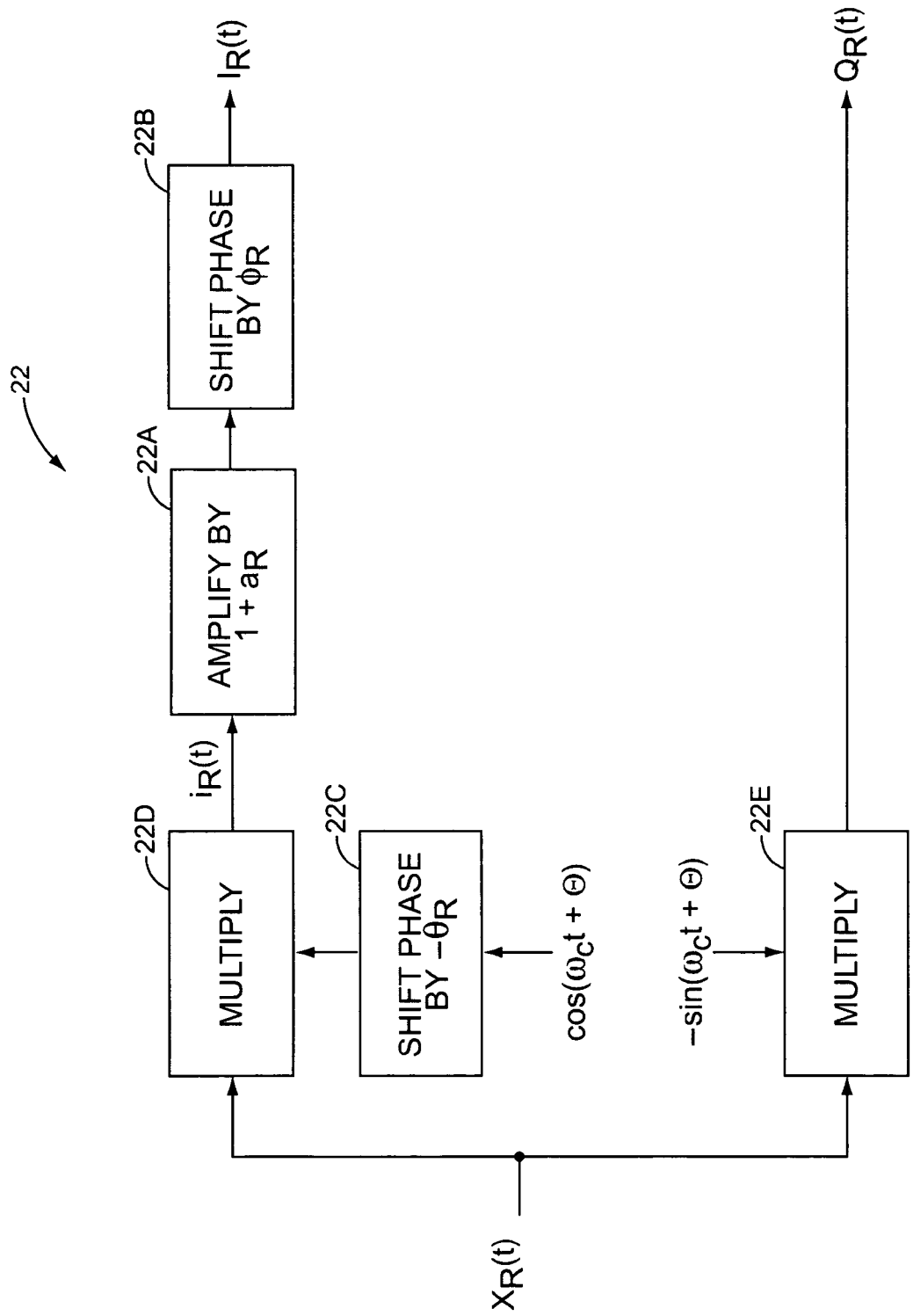
FIG. 3 is a block diagram illustrating amplitude and phase errors associated with the receiver of the transceiver of FIG. 1.

The mismatch errors of the receiver 22 occur only in the demodulator and the stages following the demodulator in the receive signal path and can be modeled as shown in FIG. 3. There are three distinct errors: an amplitude error $a_R$, which causes the baseband receive signal ($I_R$) to be amplified by a factor $1+a_R$ relative to the baseband receive signal ($Q_R$) (Block 22A), a baseband phase error $\phi_R$, which causes the baseband receive signal ($I_R$) to be advanced in phase by $\phi_R$ relative to the baseband receive signal ($Q_R$) (Block 22B), and a carrier phase error $\theta_R$, which causes the magnitude of the phase difference between the nominally orthogonal carriers to be $90°+\theta_R$ (Block 22C). Multipliers 22D and 22E operate to demodulate the modulated receive signal $X_R$. If $$X_R=2\cos[(\omega_c\pm\omega_b)t] \quad (10)$$

then $$I_R\approx(1+a_R)\cos(\omega_b t+\phi_R\pm\theta_R\mp\theta) \quad (11)$$

$$Q_R\approx\pm\sin(\omega_b t\mp\theta). \quad (12)$$

If the frequency of the received signal ($X_R$) is greater than the carrier frequency $\omega_c$, then the baseband receive signal ($I_R$) leads the baseband receive signal ($Q_R$), and the baseband phase error $\phi_R$ and the carrier phase error $\theta_R$ add. If the frequency of the received signal ($X_R$) is less than the carrier frequency $\omega_c$, then $I_R$ lags $Q_R$, and the baseband phase error $\phi_R$ and the carrier phase error $\theta_R$ subtract.

In a transceiver without calibration, amplitude and phase errors of up to 0.3 dB for $1+a_T$ and $1+a_R$, and 3° for $\phi_T\pm\theta_T$ and $\phi_R\pm\theta_R$ can occur. This is acceptable for many RF communication systems, such as wireless LANs based on the IEEE standard 802.11b. However, in order to achieve an acceptable error vector magnitude for the IEEE wireless LAN standards 802.11a and 802.11g, the transceiver 10 must achieve values ≦0.1 dB for $1+a_T$ and $1+a_R$, and ≦1° for $\phi_T \pm \theta_T$ and $\phi_R \pm \theta_R$, which requires some form of calibration.

Figure 4:
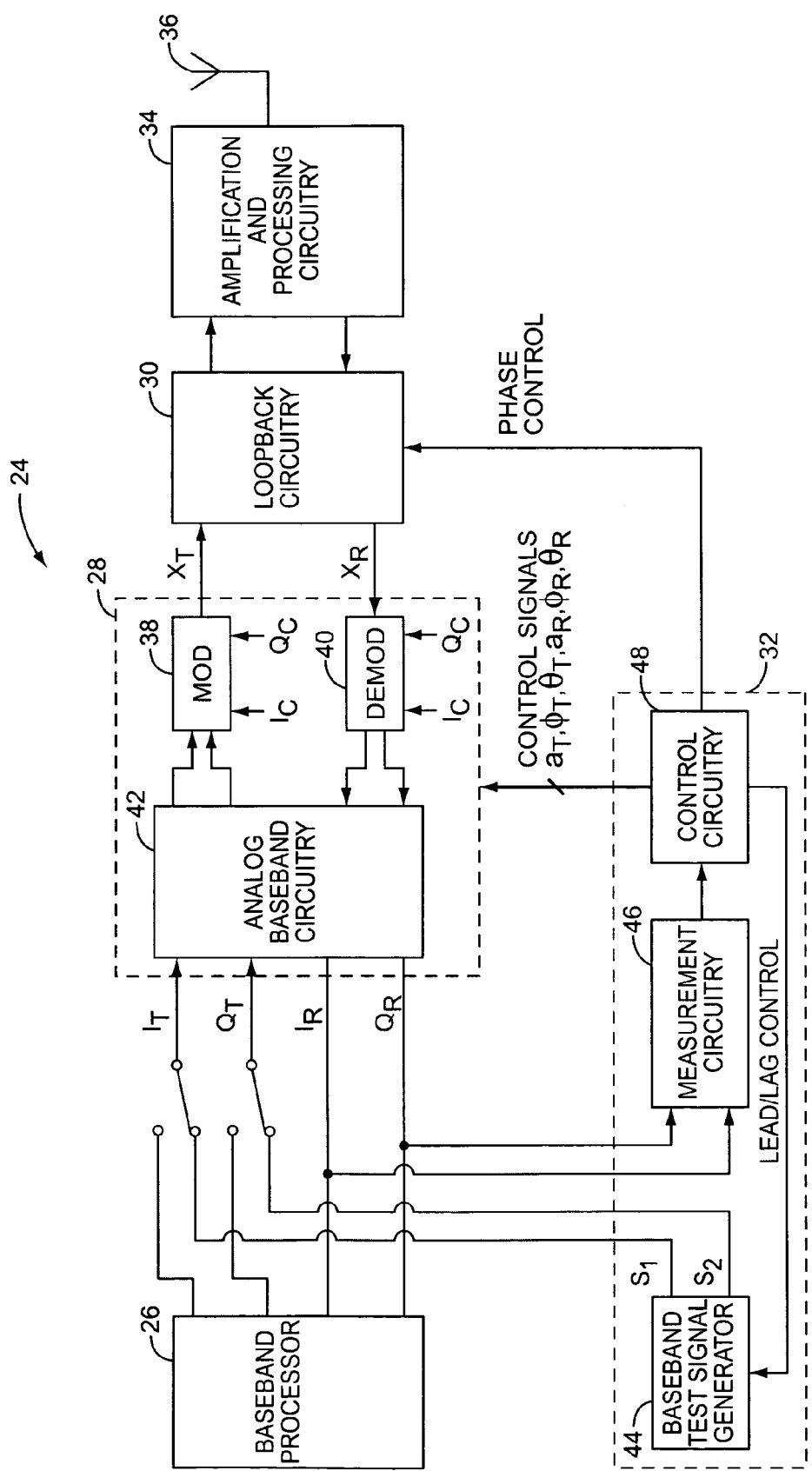
FIG. 4 illustrates a transceiver including loopback circuitry and calibration circuitry according to one embodiment of the present invention.

FIG. 4 illustrates a transceiver 24 providing I/Q calibration according to one embodiment of the present invention. In general, the transceiver 24 includes a baseband processor 26, transmit and receive circuitry 28, loopback circuitry 30, calibration circuitry 32, amplification and processing circuitry 34, and an antenna 36. In normal transmit operating mode, the modulated transmit signal $X_T$ from the transmit and receive circuitry 28 is passed to the amplification and processing circuitry 34, which operates to upconvert and amplify the modulated transmit signal $X_T$ prior to transmission via the antenna 36. In normal receive operating mode, the amplification and processing circuitry 34 operates to amplify and downconvert a received signal to provide the modulated receive signal $X_R$, which is passed to the transmit and receive circuitry 28 for demodulation.

In addition to its normal transmit and receive operating modes, the transceiver 24 has a calibration mode in which the loopback circuitry 30 forms a loopback signal path between a modulator 38 and a demodulator 40 of the transmit and receive circuitry 28. The loopback circuitry 30 may include any or none of the circuitry that follows the modulator 38 and precedes the demodulator 40 in normal operation, and may also include additional circuitry, such as switches and a phase shifter, as described in more detail below. A control input to the loopback circuitry 30 allows a phase shift of the loopback circuitry 30 to be switched between two values differing by 90°. Once the loopback circuitry 30 completes the loopback signal path, the calibration circuitry 32 operates to provide a test signal to the transmit and receive circuitry 28. Based on the test signal, the transmit and receive circuitry 28 generates a transmit signal $X_T$. Instead of passing the transmit signal $X_T$ to the amplification and processing circuitry 34, the loopback circuitry 30 passes the transmit signal $X_T$ to the demodulator 40 of the transmit and receive circuitry 28 as a receive signal $X_R$. Based on the receive signal $X_R$, the transmit and receive circuitry 28 provides orthogonal baseband receive signals $I_R$ and $Q_R$, which are provided to the calibration circuitry 32. After a series of measurements and calculations, the calibration circuitry 32 generates control signals $a_T$, $\phi_T$, $\theta_T$, $a_R$, $\phi_R$, $\theta_R$ for calibrating the transmit and receive circuitry 28.

The control signals $a_T$, $\phi_T$, $\theta_T$, $a_R$, $\phi_R$, $\theta_R$ are used to adjust a transmit amplitude error $a_T$, transmit baseband phase error $\phi_T$, transmit carrier phase error $\theta_T$, receive amplitude error $a_R$, receive baseband phase error $\phi_R$ and receive carrier phase error $\theta_R$ of the transmit and receive circuitry 28. The adjustment of $a_T$ and $\phi_T$ is implemented in the modulator 38 or in analog baseband circuitry 42, which precedes the modulator 38. Generally, the analog baseband circuitry 42 may include circuitry such as filters or buffer amplifiers. The adjustment of $\theta_T$ is implemented in circuitry that generates orthogonal transmit carriers for modulation, which may be considered part of the modulator 38 in FIG. 4. The adjustment of $a_R$ and $\phi_R$ is implemented in the demodulator 40 or in the analog baseband circuitry 42. The adjustment of $\theta_R$ is implemented in circuitry that generates orthogonal receive carriers for demodulation, which is considered to be part of the demodulator 40 in FIG. 4.

The calibration circuitry 32 includes a baseband test signal generator 44, a measurement circuitry 46, and control circuitry 48. In calibration mode, the test signal generator 44 drives the baseband transmit signals $I_T$ and $Q_T$ with two signals ($S_1$, $S_2$) of the same waveform shape and frequency and having a time offset of one quarter of a period. Thus, the fundamentals of $I_T$ and $Q_T$ are of equal amplitude and frequency with a phase difference of essentially 90°. A control signal (LEAD/LAG CONTROL) is provided to the test signal generator 44 and controls the test signal generator 44 such that $I_T$ leads $Q_T$ or $I_T$ lags $Q_T$, which may be accomplished by interchanging the two signals ($S_1$, $S_2$). The measurement circuitry 46 measures an amplitude ratio and phase difference of the fundamentals of baseband receive signals $I_R$ and $Q_R$. The control circuitry 48 provides the control signal (LEAD/LAG CONTROL) to the test signal generator 44, provides a phase switch control signal (PHASE CONTROL) to the loopback circuitry 30, calculates the errors $a_T$, $\phi_T$, $\theta_T$, $a_R$, $\phi_R$ and $\theta_R$ based on the output of the measurement circuitry 46, provides the control signals for $a_T$, $\phi_T$, $\theta_T$, $a_R$, $\phi_R$ and $\theta_R$ to the transmit and receive circuitry 28, and controls the sequence of steps in the calibration procedure.

In one embodiment, the errors $a_T$, $\phi_T$, $\theta_T$, $a_R$, $\phi_R$ and $\theta_R$ are calculated from a series of six measurements that are performed during the calibration. Let the measurements be numbered from 1 to 6, as shown in Table 1 below. Although the measurements are numbered from 1 to 6, the measurements may be made in any order. In measurements 1 to 4, the settings of the control signals for $a_T$, $\phi_T$, $\theta_T$, $a_R$, $\phi_R$ and $\theta_R$ are at predefined initial values, such as power-on default values or values from a previous calibration. In measurement 1, $I_T$ leads $Q_T$. In measurement 2, $I_T$ lags $Q_T$, and the phase shift of the loopback circuitry 30 is the same as in measurement 1. In measurement 3, $I_T$ leads $Q_T$, and the phase shift of the loopback circuitry 30 differs by 90° from its value in measurements 1 and 2. In measurement 4, $I_T$ lags $Q_T$, and the phase shift of the loopback circuitry 30 is the same as in measurement 3. In measurements 5 and 6, all settings are the same except that of the control input for $a_T$. For this example, $I_T$ leads $Q_T$, and the phase shift of the loopback circuitry 30 is the same as its value in measurements 1 and 2. In measurement 5, the control input for $a_T$ is set to a minimum limit. In measurement 6, the control input for $a_T$ is set to a maximum limit.

TABLE 1

Example of settings in measurement sequence

| Measurement number | $I_T$ leads or lags $Q_T$ | Loopback phase shift | Setting of $a_T$ | Settings of $\phi_T$, $\theta_T$, $a_R$, $\phi_R$, $\theta_R$ |
|---|---|---|---|---|
| 1 | Leads | +45° | Initial | Initial |
| 2 | Lags | +45° | Initial | Initial |
| 3 | Leads | −45° | Initial | Initial |
| 4 | Lags | −45° | Initial | Initial |
| 5 | Leads | +45° | Minimum | Initial |
| 6 | Leads | +45° | Maximum | Initial |

In each measurement, the receive baseband signals $I_R$ and $Q_R$ are of the form $$I_R = (1+\alpha_n)\cos(\omega_b t + \psi_n + \Gamma_n) \quad (13)$$

$$Q_R = \pm\sin(\omega_b t + \Gamma_n) \quad (14)$$

where total amplitude error $\alpha_n$ and total phase error $\psi_n$ represent the combined effect of $a_T$, $\phi_T$, $\theta_T$, $a_R$, $\phi_R$ and $\theta_R$ in measurement n and $\Gamma_n$ is the phase offset between the transmit and receive baseband signals. The phase offset $\Gamma_n$ is not relevant to the calibration procedure. Let the phase shift of the loopback circuitry 30 in measurements 1 and 2 be $\Phi_+$ at $\omega_c+\omega_b$ and $\Phi_-$ at $\omega_c-\omega_b$. Then $$e_1 = a_R + j(\phi_R + \theta_R) + [a_T + j(\phi_T + \theta_T)]\exp(-j2\Phi) \quad (15)$$

$$e_2 = a_R + j(\phi_R - \theta_R) + [a_T + j(\phi_T - \theta_T)]\exp(+j2\Phi) \quad (16)$$

$$e_3 = a_R + j(\phi_R + \theta_R) - [a_T + j(\phi_T + \theta_T)]\exp(-j2\Phi) \quad (17)$$

$$e_4 = a_R + j(\phi_R - \theta_R) - [a_T + j(\phi_T - \theta_T)]\exp(+j2\Phi) \quad (18)$$

where $$e_n = \alpha_n + j\psi_n \quad (19)$$

$$\Phi = \tfrac{1}{2}(\Phi_+ + \Phi_-) - \theta \quad (20).$$

Swapping the signals ($S_1$, $S_2$) driving $I_T$ and $Q_T$ inverts the contributions of the carrier phase errors $\theta_T$ and $\theta_R$ to the error vector $e_n$, thereby allowing the carrier phase errors $\theta_T$ and $\theta_R$ to be separated from the baseband phase errors $\phi_T$ and $\phi_R$. Changing the phase shift of the loopback circuitry 30 by 90° inverts the contributions of the transmit errors $a_T$, $\phi_T$, and $\theta_T$, thereby allowing the transmit errors $a_T$, $\phi_T$, and $\theta_T$ to be separated from the receive errors $a_R$, $\phi_R$, and $\theta_R$. The effect of the phase shift in the loopback circuitry 30 and the phase difference $\theta$ between the transmit and receive carriers is to rotate the combined contribution of the transmit errors $a_T$, $\phi_T$, and $\theta_T$ by $\pm 2\Phi$, so that a correction for this rotation is needed in order to separate the amplitude component $a_T$ from the phase components $\phi_T$ and $\theta_T$ of the combined transmit error. Measurements 5 and 6 enable this correction to be made.

Let $a_T$ be equal to $a_{TMIN}$ at the minimum adjustment setting for $a_T$ and $a_{TMAX}$ at the maximum adjustment setting for $a_T$. If the relative phase of $I_T$ and $Q_T$ and the phase shift of the loopback circuitry 30 are the same in measurements 5 and 6 as in measurement 1, for example, then it follows from Equation 15 that $$e_5 = a_R + j(\phi_R + \theta_R) + [a_{Tmin} + j(\phi_T + \theta_T)]\exp(-2j\Phi) \quad (21)$$

$$e_6 = a_R + j(\phi_R + \theta_R) + [a_{Tmax} + j(\phi_T + \theta_T)]\exp(-2j\Phi) \quad (22)$$

Hence, the required rotation angle is given by $$2\Phi = -\arg(e_6 - e_5), \quad (23)$$

where the arg( ) function returns the polar angle of a rectangular coordinate pair represented by a complex number, and from Equations 15 to 18, it follows that $$a_R = \tfrac{1}{4}Re(e_1 + e_2 + e_3 + e_4) \quad (24)$$

$$\phi_R = \tfrac{1}{4}Im(e_1 + e_2 + e_3 + e_4) \quad (25)$$

$$\theta_R = \tfrac{1}{4}Im(e_1 - e_2 + e_3 - e_4) \quad (26)$$

$$a_T = \tfrac{1}{4}Re[(e_1 - e_3)\exp(2j\Phi) + (e_2 - e_4)\exp(-2j\Phi)] \quad (27)$$

$$\phi_T = \tfrac{1}{4}Im[(e_1 - e_3)\exp(2j\Phi) + (e_2 - e_4)\exp(-2j\Phi)] \quad (28)$$

$$\theta_T = \tfrac{1}{4}Im[(e_1 - e_3)\exp(2j\Phi) - (e_2 - e_4)\exp(-2j\Phi)] \quad (29)$$

After calculating the errors $a_T$, $\phi_T$, $\theta_T$, $a_R$, $\phi_R$ and $\theta_R$, the control circuitry 48 updates the settings of the control signals for $a_T$, $\phi_T$, $\theta_T$, $a_R$, $\phi_R$ and $\theta_R$ to correct these errors. Depending on the amount by which the settings are changed and the accuracy of the adjustment circuitry, further measurement and update cycles may be needed until the errors are as close to zero as the resolution and range of the adjustments will allow. Also, changes that are smaller than the measured errors have the advantage of de-emphasizing noise. In normal operation of the transceiver 24 after calibration, the control circuitry 48 maintains the settings of $a_T$, $\phi_T$, $\theta_T$, $a_R$, $\phi_R$ and $\theta_R$ that were established at the conclusion of the calibration procedure.

The control circuitry 48 of the calibration circuitry 32 of FIG. 4 provides both a full and an incremental calibration. The full calibration is performed in one uninterrupted time interval, during which the error measurements and adjustment updates are performed as many times as are needed to ensure that the errors are fully minimized. The incremental calibration is performed as a sequence of partial calibrations in separate time intervals, and the update of the error adjustments occurs after a defined number of partial calibrations.

In normal transmit and receive operation of the transceiver 24, the data traffic occurs in separate packets. In addition to its transmit, receive and calibration modes, the transceiver 24 also has an idle mode that it enters during short intervals between data packets, and a reset mode that it enters after being powered up and during long intervals without data traffic. In one embodiment, a full calibration is initiated automatically when the transceiver 24 enters idle mode from reset mode. In one embodiment, a partial incremental calibration, which is short enough to fit into the minimum interval between data packets, is initiated automatically when the transceiver 24 enters idle mode from transmit or receive mode. The purpose of the incremental calibration is to correct any drift in the amplitude and phase errors due to temperature changes since a previous full calibration.

The calibration procedure can be divided into three steps. Referring to table 1 above, in step 1, measurements 5 and 6 are performed to determine $\Phi$ using Equation 23. In step 2, measurements 1 to 4 are performed to determine $e_1$ to $e_4$ in Equations 24 to 29. In step 3, $a_T$, $\theta_T$, $\phi_T$, $a_R$, $\theta_R$ and $\phi_R$ are calculated, and the corresponding adjustment inputs are updated to correct the errors. In one embodiment, the magnitude of the correction is approximately one half of the measured error. The full calibration performs the steps in the sequence 1-2-3-2-3-2-3. In one embodiment, the full calibration takes approximately 81 μs. The incremental calibration performs the steps in the sequence 1-2-3-1-2-3-1-2-3-. . . In one embodiment, each partial calibration is performed in a time interval of 5.5 μs or less. After a predetermined number of partial calibrations have been performed, the error adjustments are updated.

Figure 5:
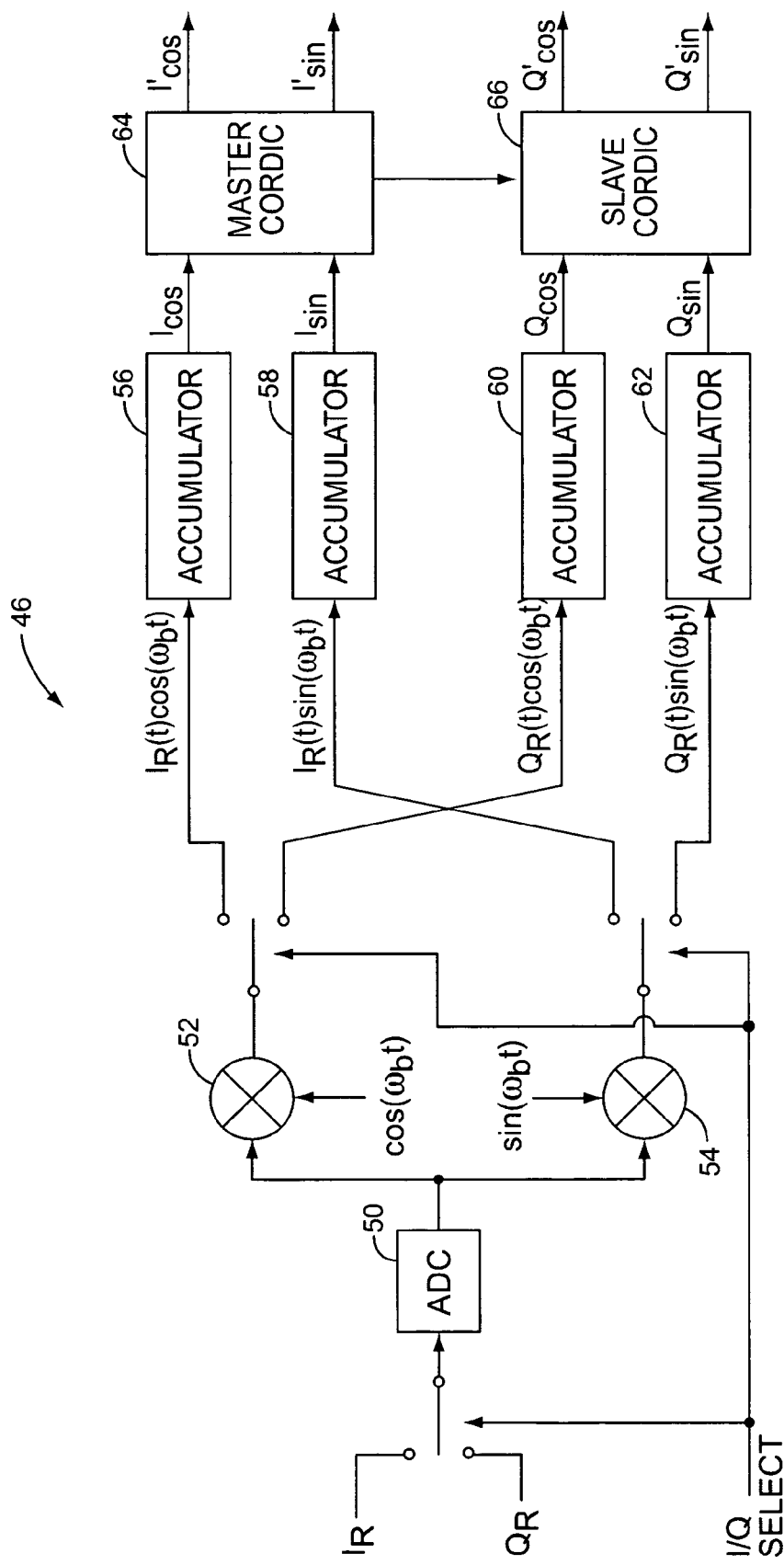
FIG. 5 illustrates one embodiment of the measurement circuitry of the calibration circuitry illustrated in FIG. 4.

FIG. 5 illustrates one embodiment of the measurement circuitry 46. In this embodiment, the measurement circuitry 46 includes an analog-to-digital converter (ADC) 50, two multipliers 52 and 54, four accumulators 56–62 and two coordinate rotation digital computers (CORDICs) 64 and 66, designated as a master CORDIC and a slave CORDIC. The ADC 50 alternately samples $I_R$ and $Q_R$ based on an I/Q select signal (I/Q SELECT), thereby providing measurements of each of the signals $I_R$ and $Q_R$ with equal gain. The multipliers 52 and 54 multiply the ADC output with sine and cosine functions at the baseband signal frequency $\omega_b$. For each of the multipliers 52 and 54, there are two accumulators 56, 58 and 60, 62, respectively. The accumulators 56 and 60 integrate the result of the multiplication of $I_R$ with the sine or cosine function, and the accumulators 58 and 62 integrate the result of the multiplication of $Q_R$ with the sine or cosine function. The integration is performed over an integer number of periods of the baseband frequency $\omega_b$, such that at the end of the integration, the outputs of the accumulators are equal to the real and imaginary parts of the complex Fourier coefficients of the fundamentals of $I_R$ and $Q_R$.

Let the Fourier coefficients of the fundamentals of $I_R$ and $Q_R$ be $I_{cos}+jI_{sin}$ and $Q_{cos}+jQ_{sin}$ respectively. From Equations 13 and 14, it follows that $$I_{cos}=(1+\alpha_n)\cos(\psi_n+\Psi) \quad (30)$$

$$I_{sin}=-(1+\alpha_n)\sin(\psi_n+\Psi) \quad (31)$$

$$Q_{cos}=\pm\cos\Psi \quad (32)$$

$$Q_{sin}=\pm\sin\Psi \quad (33)$$

where $\psi$ is the phase offset between $I_R$ and $Q_R$ and the cosine and sine functions with which they are multiplied. The master CORDIC 64 rotates $I_{cos}+jI_{sin}$ until its imaginary part is equal to zero, and the slave CORDIC 66 rotates $Q_{cos}+jQ_{sin}$ by the same amount. Let the output of the master CORDIC 64 be $I'_{cos}+jI'_{sin}$ and the output of the slave CORDIC 66 be $Q'_{cos}+jQ'_{sin}$. Then $$I'_{cos}=1+\alpha_n \quad (34)$$

$$I'_{sin}=0 \quad (35)$$

$$Q'_{cos}=\pm\cos\psi_n \quad (36)$$

$$Q'_{sin}=\mp\sin\psi_n \quad (37)$$

In this way, the values of $e_n=\alpha_n+j\psi_n$ that are needed to calculate $a_T$, $\phi_T$, $\theta_T$, $a_R$, $\phi_R$ and $\theta_R$ using Equations 24 to 29 are obtained. The parameter $2\Phi$ in Equation 29 is determined by rotating $e_6-e_5$ until its imaginary part is equal to zero. The resulting value is stored and used to perform the de-rotations of $e_1$ to $e_4$ by $\pm 2\Phi$ in Equations 26 to 28.

In one embodiment, the ADC 50 in the measurement circuitry 46 is of the successive approximation type, with a resolution of 8 bits and a sample rate of 34 Msamples/s, and is clocked at the carrier frequency $\omega_C$, with 11 clock periods per sample. Since the ADC input switches between $I_R$ and $Q_R$ on successive samples, each is sampled at 17 Msamples/s. The integration in the accumulators 56–62 is performed over an interval of 2 μs, which is equal 34 sampling periods and 10 periods of the baseband frequency. In this embodiment, the sample rate has the advantage that most of the harmonics of the baseband test signals $S_1$ and $S_2$ from the test signal generator 44 are rejected by the integration process.

Figure 6:
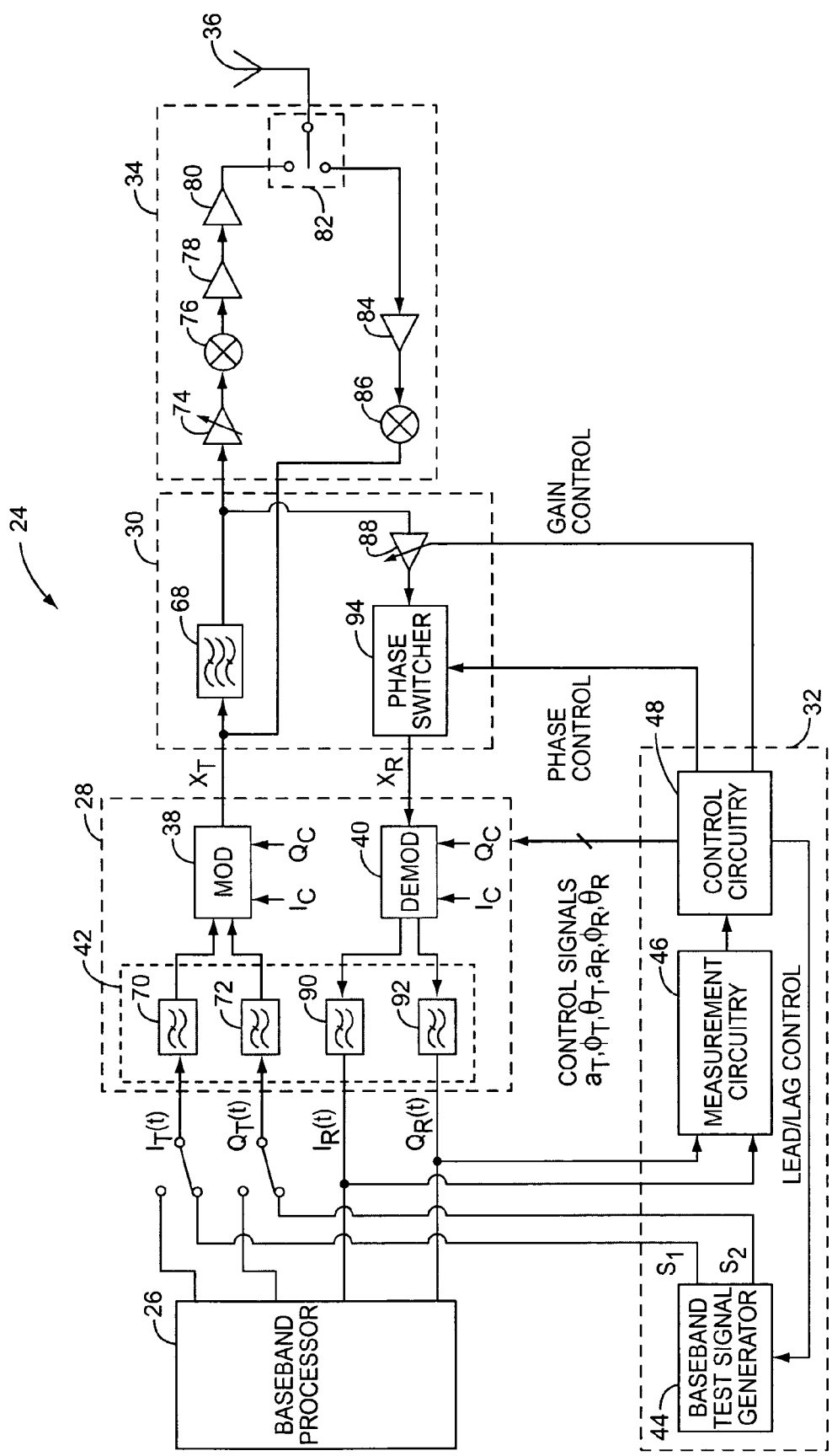
FIG. 6 illustrates another embodiment of a transceiver including loopback circuitry and calibration circuitry according to the present invention.

FIG. 6 shows a second embodiment of the transceiver 24 of the present invention. The transceiver 24 is may be used in wireless LANs based on the IEEE standard 802.11g. A heterodyne architecture is used in both the transmit and receive signal paths, with a common intermediate frequency (IF). In one embodiment, the common IF frequency is 374 MHz. In this embodiment, the loopback circuitry 30 includes an IF band-pass filter 68 that is shared by the transmit and receive signal paths.

In normal transmit operating mode, the signal path for the transmit signals $I_T$ and $Q_T$ to the antenna 36 includes low-pass baseband filters 70 and 72, the modulator 38, the IF band-pass filter 68, a variable-gain amplifier (VGA) 74, an up-conversion mixer 76, a driver amplifier 78, a power amplifier (PA) 80 and a transmit-receive switch 82. In normal receive operating mode, the signal path from the antenna 36 to the receive signals $I_R$ and $Q_R$ includes the transmit-receive switch 82, a low-noise amplifier (LNA) 84, a down-conversion mixer 86, the IF band-pass filter 68, a VGA 88, the demodulator 40, and low-pass baseband filters 90 and 92 for each of the signals $I_R$ and $Q_R$.

In calibration mode, the modulator 38, the demodulator 40, the baseband filters 70, 72, 90, and 92 and the calibration circuitry 32 are enabled. The loopback circuitry 30 implements the loopback path by enabling the receive VGA 88 and disabling the down-conversion mixer 86, so that the modulator 38 drives the demodulator 40 via the IF filter 68 and the receive VGA 88. Since the transmit VGA 74, the up-conversion mixer 76, the driver amplifier 78, the PA 80 and the LNA 84 are not needed in calibration mode, they may also disabled.

Figure 7:
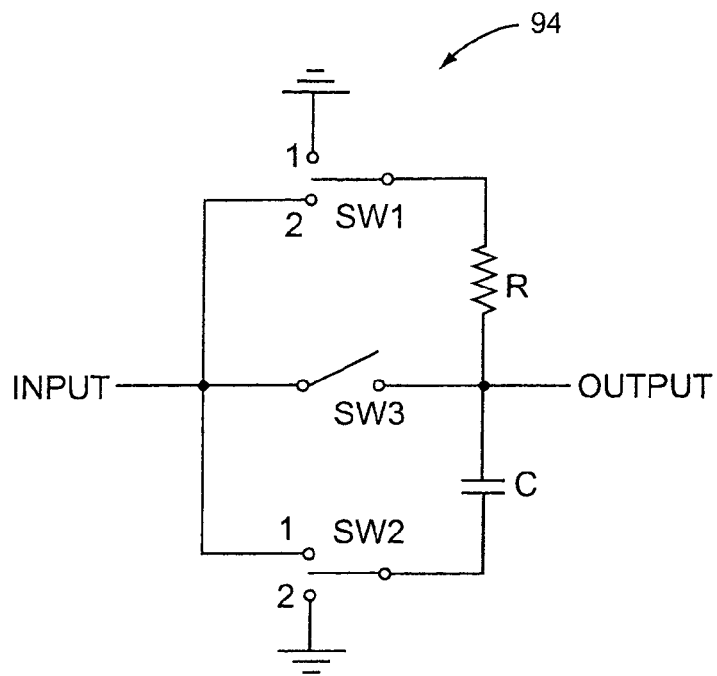
FIG. 7 illustrates a phase shifter of the loopback circuitry of FIG. 6.

One embodiment of phase switching circuitry 94 in the loopback circuitry 30 is implemented by an RC (resistor-capacitor) element, as shown in FIG. 7. As illustrated, the phase switching circuitry 94 includes resistor (R), capacitor (C), and switches (SW1–SW3) arranged as shown. By forcing the first and second switches (SW1 and SW2) to their respective first positions (1), the phase switching circuitry 94 is configured as a high-pass filter with a cut-off frequency nominally equal to the IF carrier frequency. By forcing the first and second switches (SW1 and SW2) to their respective second positions (2), the phase switching circuitry 94 is configured as a low-pass filter with a cut-off frequency nominally equal to the IF carrier frequency. Because the cut-off frequency is the same for each configuration, the difference in phase shift between the two configurations is 90°. In normal operation of the transceiver 24, the phase switching circuitry 94 is by-passed by closing the third switch (SW3) to avoid degrading the performance of the receiver.

Figure 8:
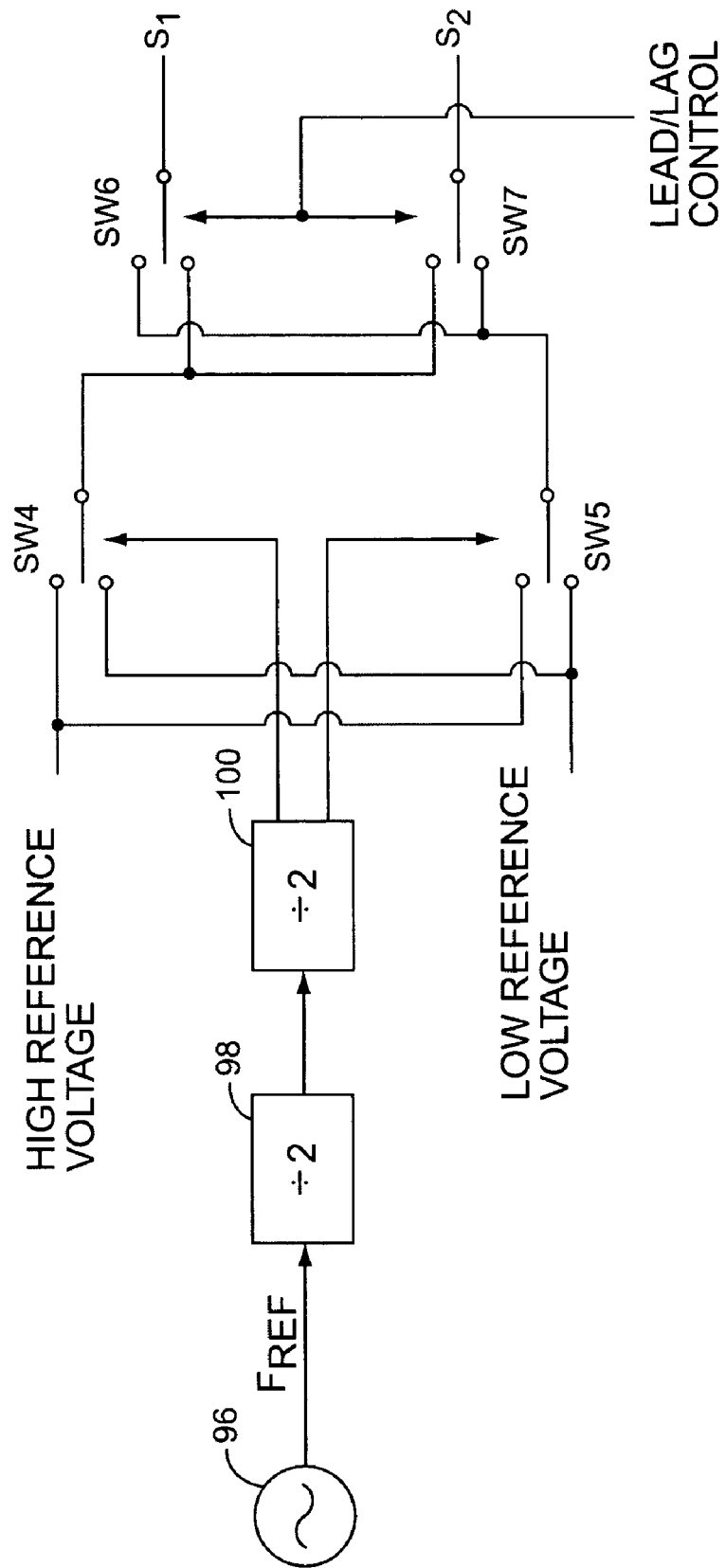
FIG. 8 illustrates one embodiment of the test signal generator of FIGS. 4 and 6.

FIG. 8 illustrates one embodiment of the test signal generator 44 of FIGS. 4 and 6. A local oscillator 96 generates a reference frequency ($F_{REF}$). The reference frequency ($F_{REF}$) may also be used by the transceiver 24 to generate frequencies for upconversion and downconversion. The reference frequency ($F_{REF}$) is divided by four using two cascaded dividers 98 and 100. In one embodiment, the dividers 98 and 100 are master-slave toggle flip-flops. The orthogonal outputs of the second divider 100 control switches SW4 and SW5, thereby switching the outputs of the test signal generator 44 between a low and a high reference voltage, resulting in square waves with 90° phase difference. Switches SW6 and SW7 are controlled such that the output signal $S_1$ either leads or lags the output signal $S_2$. The use of the dividers 98 and 100, which in this embodiment divide by two, ensures that the accuracy of the output phase difference is independent of the duty cycle of the reference frequency ($F_{REF}$). The technique of switching between the same low and high reference voltages at each output ensures equal amplitudes for the two output waveforms. With a carefully optimized layout, the test signal generator 44 can achieve an amplitude matching accuracy of 0.01 dB and a phase accuracy of 0.1°.

Figure 9:
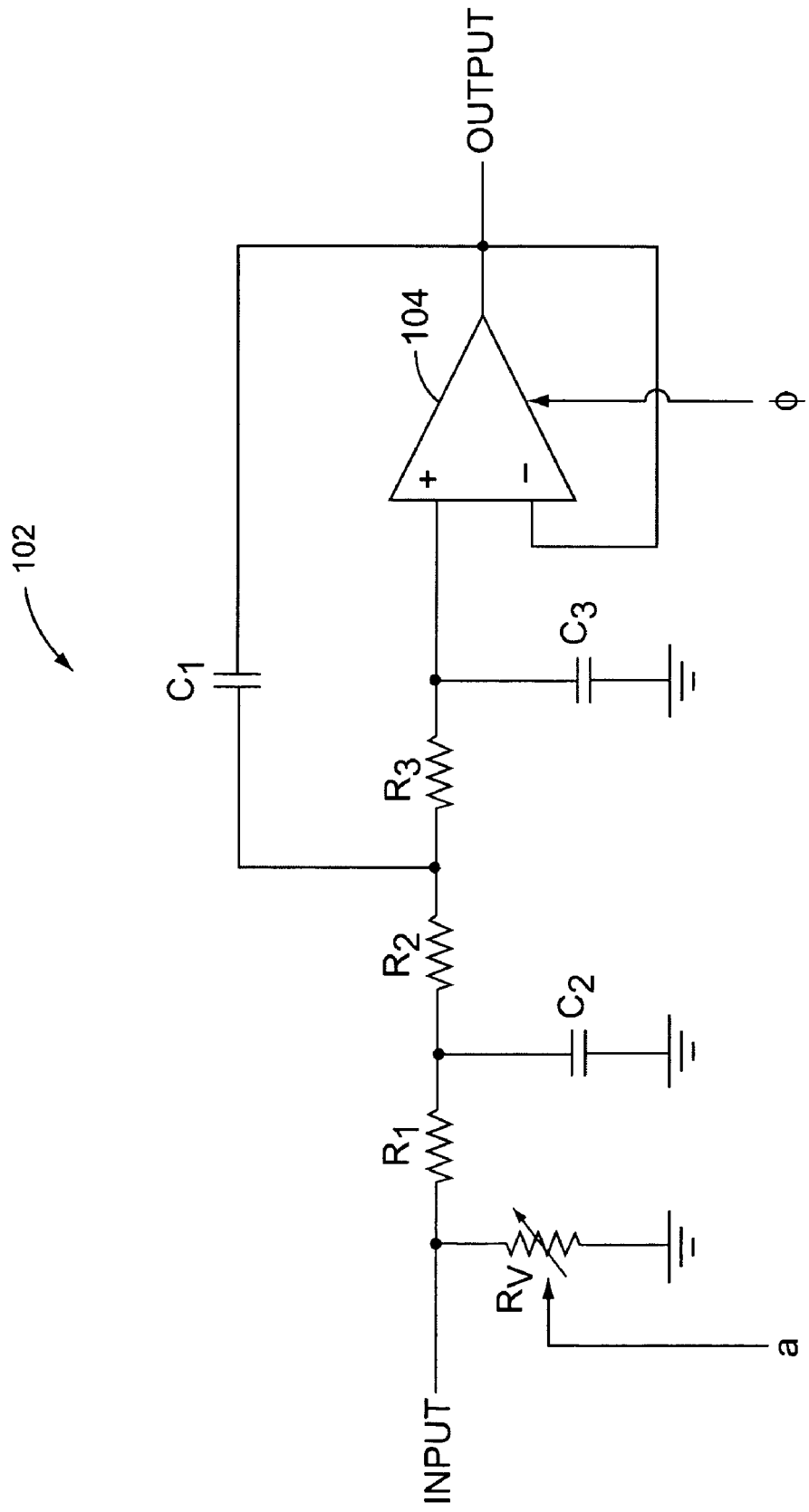
FIG. 9 illustrates one embodiment of the baseband filters of FIG. 6.

The transmit and receive amplitude errors $a_T$ and $a_R$ are adjusted by switching additional resistors in parallel with gain-determining resistors in the analog baseband signal paths. FIG. 9 illustrates one embodiment of the baseband filters 70, 72, 90, and 92. In this embodiment, each of the baseband filters 70, 72, 90, and 92 is implemented as active RC, third order Bessel filter 102. The filter 102 includes resistors $R_1$–$R_3$ and capacitors $C_1$–$C_3$ arranged as shown. In this embodiment, the transmit and receive amplitude errors $a_T$ and $a_R$ are adjusted by adjusting a resistance of a variable resistor $R_V$. The variable resistor $R_V$ may be a single variable resistor or plurality of resistors switchably connected to the filter 102. The transmit and receive baseband phase errors $\phi_T$ and $\phi_R$ are adjusted by varying a bias current of an amplifier 104, thereby changing the gain-bandwidth product of the amplifier 104 and thus the cut-off frequency and phase shift of the filter 102.

The baseband phase errors are a function of the baseband frequency. In one embodiment, calibration is performed at a baseband frequency of near the middle of the band of the baseband signals $I_T$, $Q_T$, $I_R$, and $Q_R$. For example, the baseband signals $I_T$, $Q_T$, $I_R$, and $Q_R$ may have a bandwidth of 8.5 MHz and the calibration is performed at 5 MHz. The choice of a calibration frequency near the middle of the band reflects the fact that the phase accuracy relates to the average phase error over the bandwidth of the modulated signal. The technique of adjusting the baseband phase errors $\phi_T$ and $\phi_R$ by changing the bandwidth of the baseband filters 70, 72, 90, and 92 reflects the fact that the dominant cause of the baseband phase errors $\phi_T$ and $\phi_R$ is mismatch between the baseband filters 70, 72, 90, and 92.

Figure 10:
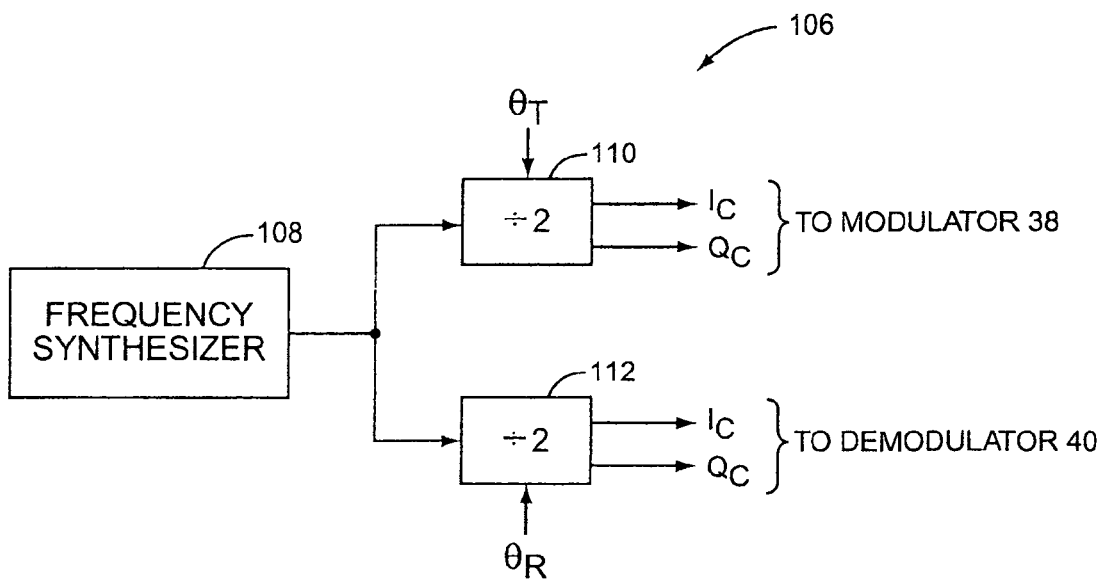
FIG. 10 illustrates circuitry for generating transmit and receive carrier signals according to one embodiment of the present invention.

FIG. 10 illustrates one embodiment of carrier generation circuitry 106, which generates the orthogonal carriers used by the modulator 38 and demodulator 40. The circuitry 106 includes a frequency synthesizer 108 operating at twice the carrier frequency $\omega_C$ and that drives dividers 110 and 112. In one embodiment, the dividers 110 and 112 are in the form of a master-slave toggle flip-flop. Based on the output of the frequency synthesizer 108 the dividers 110 and 112 generate orthogonal transmit and receive carriers each at the carrier frequency $\omega_C$ for modulator 38 and demodulator 40, respectively. The transmit and receive carrier phase errors $\theta_T$ and $\theta_R$ are adjusted by introducing an offset voltage at the input of the dividers 110 and 112, which shifts the positive and negative zero crossings of the input waveform in opposite directions in time, and hence shifts the phase of the divider outputs relative to each other.

In one embodiment, a 5-bit adjustment with a nominal least significant bit (LSB) step of 0.04 dB and a nominal range of −0.60 dB to +0.60 dB is provided for each of $1+a_T$ and $1+a_R$, and a 4-bit adjustment with a nominal LSB step of 0.4° and a nominal range of −2.8° to +2.8° is provided for $\phi_T$, $\theta_T$, $\phi_R$ and $\theta_R$. These ranges allow sufficient margin for mismatches in the signal path circuitry before calibration and for the tolerances of the adjustment circuitry, and the resolutions allow sufficient margin for errors in the generation of $I_T$ and $Q_T$ and in the measurement of $I_R$ and $Q_R$. Further, the calibration according to the present invention reduces amplitude errors to $\leq 0.1$ dB for $1+a_T$ and $1+a_R$ and the phase errors to $\leq 1°$ for $\phi_T \pm \theta_T$ and $\phi_R \pm \theta_R$.

The transceiver 24 of FIGS. 4 and 6 provides substantial opportunity for variation without departing from the spirit and scope of the present invention. For example, the control circuitry 48 may use the transmit VGA 74 to control the gain in the loopback circuitry 30 such that the amplitude of the baseband receive signals $I_R$ and $Q_R$ at the input of the measurement circuitry 46 is close to full-scale, thereby maximizing the accuracy of analog-to-digital conversion within the measurement circuitry 46. As another example, the adjustment of one or more of the transmit amplitude error $a_T$, transmit baseband phase error $\phi_T$, receive amplitude error $a_R$ and receive baseband phase error $\phi_R$ may be implemented in the baseband processor 26. As another example, the baseband test signals $S_1$ and $S_2$ may be generated at a different point before the modulator 38 in the transmit signal path other than the point shown in FIGS. 4 and 6. As another example, the receive baseband signals $I_R$ and $Q_R$ may be measured at any point at or after the outputs of the demodulator 40 in the receive signal path. Also, the baseband test signals $S_1$ and $S_2$ may be generated in the baseband processor 26 using the same circuitry as is used to generate the transmit signals $I_T$ and $Q_T$ in normal operation, so that the calibration also corrects the contribution of the baseband processor 26 to the transmit amplitude and phase errors $a_T$, $\phi_T$, and $\theta_T$. The receive baseband signals $I_R$ and $Q_R$ may be measured in the baseband processor 26 using the same circuitry as is used to process the receive signals $I_R$ and $Q_R$ in normal operation, so that the calibration also corrects the contribution of the baseband processor 26 to the receive amplitude and phase errors $a_R$, $\phi_R$, and $\theta_R$. The transmit errors $a_T$, $\phi_T$, and $\theta_T$ may be separated from the receive errors $a_R$, $\phi_R$, and $\theta_R$ by swapping the orthogonal carriers (FIG. 10) in either the modulator 38 or the demodulator 40, which is equivalent to switching the phase shift of the loopback circuitry 30 by 90°. The combined effect of the phase shift of the loopback circuitry 30 and the phase difference between the transmit and receive carriers can be measured by switching the adjustment settings for any of the following between any two different values: transmit amplitude error $a_T$, transmit baseband phase error $\phi_T$, and transmit carrier phase error $\theta_T$. The calibration circuitry 32 may control the gain at any point in the signal path in order to control the signal amplitude at the point where the receive baseband signals $I_R$ and $Q_R$ are measured.

Those skilled in the art will recognize improvements and modifications to the preferred embodiments of the present invention. All such improvements and modifications are considered within the scope of the concepts disclosed herein and the claims that follow.

What is claimed is:

1. A transceiver providing self-calibration and comprising:
   a) transmit and receive circuitry adapted to receive control signals for adjusting transmit and receive amplitude and phase errors, the transmit and receive circuitry comprising:
      a modulator adapted to receive baseband transmit signals and provide modulated transmit signals; and
      a demodulator adapted to demodulate receive signals and provide baseband receive signals;
   b) loopback circuitry adapted to connect the output of the modulator to the input of the demodulator during calibration such that the receive signals are the modulated signals from the modulator; and
   c) calibration circuitry adapted to provide test signals as the baseband transmit signals during calibration and to adjust the control signals based on a series of measurements of the baseband receive signals, wherein the series of measurements includes at least one measurement to determine a combined effect of the phase offset of the loopback circuitry and a phase difference between the modulated transmit signals and the receive signals.

2. The transceiver of claim 1 wherein the calibration circuitry comprises:
   a) test signal generation circuitry adapted to generate the test signals during calibration;
   b) measurement circuitry adapted to perform the series of measurements including measurements of a total amplitude error and a total phase error of the baseband receive signals; and
   c) control circuitry adapted to:
      i) calculate the transmit and receive amplitude and phase errors based on the total amplitude errors and the total phase errors; and
      ii) adjust the control signals based on the transmit and receive amplitude and phase errors.

3. The transceiver of claim 2 wherein the test signals are orthogonal test signals and the test signal generation circuitry generates each of a first of the orthogonal test signals and a second of the orthogonal test signals based on switching between a first reference voltage and a second reference voltage.

4. The transceiver of claim 2 wherein the measurement circuitry comprising analog-to-digital conversion circuitry adapted to digitize the baseband receive signals at a sample rate that rejects harmonics of the test signals.

5. The transceiver of claim 4 wherein the measurement circuitry further comprises circuitry adapted to generate complex Fourier coefficients based on the digitized baseband receive signals.

6. The transceiver of claim 5 wherein the measurement circuitry further comprises one or more coordinate rotation digital computers (CORDICs) adapted to rotate the complex Fourier coefficients by an angle such that the total amplitude error and the total phase error are provided.

7. The transceiver of claim 6 wherein a rotation angle determined by a first of the one or more CORDICs is provided to a second of the one or more CORDICs.

8. The transceiver of claim 1 further comprising:
amplification and processing circuitry adapted to amplify the modulated transmit signal prior to transmission; and
baseband processing circuitry adapted to provide the baseband transmit signals to the transmit and receive circuitry and receive baseband receive signals from the transmit and receive circuitry during normal operation, wherein the loopback circuitry is further adapted to connect the transmit and receive circuitry to the amplification and processing circuitry during normal operation.

9. The transceiver of claim 1 wherein the transmit and receive amplitude and phase errors include a transmit amplitude error, a transmit baseband phase error, a transmit carrier phase error, a receive amplitude error, a receive baseband error, and a receive carrier error, and the control signals include a transmit amplitude error control signal, a transmit baseband phase error control signal, a transmit carrier phase error control signal, a receive amplitude error control signal, a receive baseband error control signal, and a receive carrier error control signal.

10. The transceiver of claim 9 wherein the transmit and receive circuitry further comprises analog baseband circuitry including one or more baseband filters adapted to filter the test signals based on the transmit baseband control signal and one or more baseband filters adapted to filter the baseband receive signals based on the receive baseband control signal, wherein the transmit and receive baseband phase errors are adjusted by changing a cut-off frequency and a phase shift of the baseband filters.

11. The transceiver of claim 9 wherein the calibration circuitry adjusts the transmit and receive amplitude errors based on adjusting a first gain in the transmit path of the analog baseband circuitry and a second gain in the receive path of the analog baseband circuitry.

12. The transceiver of claim 9 wherein the calibration circuitry adjusts the transmit and receive carrier phase errors based on adjusting a relative phase of an in-phase component of a first carrier signal used by the modulator to a quadrature component of the first carrier signal used by the modulator and a relative phase of an in-phase component of a second carrier signal used by the demodulator to a quadrature component of the second carrier signal used by the demodulator.

13. The transceiver of claim 1 wherein the loopback circuitry is further adapted to receive a phase control signal, further wherein the calibration circuitry is further adapted to provide the phase control signal and switch the phase offset of the loopback circuitry between two values that are essentially 90 degrees apart during calibration, thereby allowing the transmit amplitude and phase errors to be separated from the receive amplitude and phase errors.

14. The transceiver of claim 1 wherein the modulator operates based on orthogonal carrier signals, and the at least one measurement of the series of measurements includes a first measurement made when a first of the orthogonal carriers signals leads a second of the orthogonal carrier signals and a second measurement made when the first of the orthogonal carrier signals lags the second of the orthogonal carrier signals, thereby separating the transmit amplitude and phase errors from the receive amplitude and phase errors.

15. The transceiver of claim 1 wherein the demodulator operates based on orthogonal carrier signals, and the at least one measurement of the series of measurements includes a first measurement made when a first of the orthogonal carrier signals leads a second of the orthogonal carrier signals and a second measurement made when the first of the orthogonal carrier signals lags the second of the orthogonal carrier signals, thereby separating the transmit amplitude and phase errors from the receive amplitude and phase errors.

16. The transceiver of claim 1 wherein the test signals include two orthogonal test signals, and the calibration circuitry is further adapted to generate the orthogonal test signals such that the first orthogonal test signal either leads or lags the second orthogonal test signal, thereby allowing the transmit phase error to be separated into a transmit baseband phase error and a transmit carrier phase error and the receive phase error to be separated into a receive baseband phase error and a receive carrier phase error.

17. The transceiver of claim 1 wherein the modulator receives transmit carrier signals and the demodulator receives receive carrier signals, and the calibration circuitry is further adapted to switch one or more of the control signals between two different values, thereby determining the combined effect of the phase offset of the loopback circuitry and the phase difference between transmit and receive carrier signals.

18. The transceiver of claim 1 wherein the loopback circuitry comprises variable gain amplification circuitry adapted to amplify the receive signals based on a gain control signal from the calibration circuitry.

19. The transceiver of claim 1 wherein the calibration circuitry is further adapted to perform an incremental calibration process executed as a series of partial calibrations in separate time intervals.

20. The transceiver of claim 19 wherein the transceiver operates to transmit and receive data packets and the duration of each of the partial calibrations is less than a minimum time interval between data packets, further wherein a partial calibration is performed during the time interval between packets.

21. The transceiver of claim 1 wherein the transceiver further comprises baseband processing circuitry comprising the calibration circuitry, wherein the test signals are generated by the same circuitry used to provide the baseband transmit signals during normal operation.

22. The transceiver of claim 21 wherein the measurements are made using circuitry that processes the baseband receive signals during normal operation.

23. A method for self-calibrating a transceiver:
a) providing a loopback path from an output of a modulator in a transmit path of the transceiver to an input of a demodulator in a receive path of the transceiver;
b) providing test signals as baseband transmit signals to the modulator;
c) performing a series of measurements including measurements of a total amplitude error and a total phase error of baseband receive signals from the demodulator, wherein the series of measurements further includes at least one measurement to measure a combined effect of a phase shift of the loopback path and a phase difference between a transmit carrier used by the modulator and a receive carrier used by the demodulator;
d) calculating transmit and receive amplitude and phase errors based on the series of measurements; and
e) adjusting circuitry within the transceiver to adjust the amplitude and phase errors of the transmit path and the receive path.

24. The method of claim 23 wherein the performing the series of measurements step comprises performing at least one measurement when the loopback path has a first phase shift and at least one measurement when the loopback path has a second phase shift that differs from the first phase shift by essentially ninety degrees, thereby separating the transmit amplitude and phase errors from the receive amplitude and phase errors.

25. The method of claim 23 wherein the modulator receives a first and second orthogonal carrier signals, further wherein the performing the series of measurements step comprises performing at least one measurement when the first orthogonal carrier signal leads the second orthogonal carrier signal and at least one measurement when the first orthogonal carrier signal lags the second orthogonal carrier signal, thereby separating the transmit amplitude and phase errors from the receive amplitude and phase errors.

26. The method of claim 23 wherein the demodulator receives a first and second orthogonal carrier signals, further wherein the performing the series of measurements step comprises performing at least one measurement when the first orthogonal carrier signal leads the second orthogonal carrier signal and at least one measurement when the first orthogonal carrier signal lags the second orthogonal carrier signal, thereby separating the transmit amplitude and phase errors from the receive amplitude and phase errors.

27. The method of claim 23 wherein the performing series of measurements step including the at least one measurement to measure the combined effect of a phase shift of the loopback path and a phase difference between a transmit carrier used by the modulator and a receive carrier used by the demodulator is based on switching one or more of the transmit amplitude and phase errors between two different values.

28. The method of claim 23 wherein the transmit and receive amplitude and phase errors include a transmit amplitude error, a transmit baseband phase error, a transmit carrier phase error, a receive amplitude error, a receive baseband error, and a receive carrier error, and the adjusting step adjusts the transmit amplitude error, the transmit baseband phase error, the transmit carrier phase error, the receive amplitude error, the receive baseband error, and the receive carrier error based on the series of measurements.

29. The method of claim 28 wherein the test signals comprise a first and second orthogonal test signals, further wherein the performing the series of measurements step comprises performing at least one measurement when the first orthogonal test signal leads the second orthogonal test signal and at least one measurement when the first orthogonal test signal lags the second orthogonal test signal, thereby separating the transmit baseband phase error from the receive baseband phase error.

30. The method of claim 28 wherein the performing the series of measurements step comprises:
a) measuring a first total amplitude error and a first total phase error when a first of the test signals leads a second of the test signals and a phase offset of the loopback path is at an initial value;
b) measuring a second total amplitude error and a second total phase error when the first of the test signals lags the second of the test signals and a phase offset of the loopback path is at an initial value;
c) measuring a third total amplitude error and a third total phase error when the first of the test signals leads the second of the test signals and a phase offset of the loopback path is at a second value that is essential 90 degrees from the initial value;
d) measuring a fourth total amplitude error and a fourth total phase error when the first of the test signals lags the second of the test signals and a phase offset of the loopback path is at the second value that is essential 90 degrees from the initial value;
f) measuring a fifth total amplitude error and a fifth total phase error when the transmit amplitude control signal is at a first value; and
g) measuring a sixth total amplitude error and a sixth total phase error when the transmit amplitude control signal is at a second value.

31. The method of claim 30 wherein the calculating step comprises calculating the transmit amplitude error, the transmit baseband phase error, the transmit carrier phase error, the receive amplitude error, the receive baseband error, and the receive carrier error based on the first, second, third, fourth, fifth, and sixth total amplitude and phase errors.

32. The method of claim 28 wherein the adjusting step comprises adjusting the transmit and receive amplitude errors based on controlling a gain of each of the transmit and receive paths.

33. The method of claim 28 wherein the adjusting step comprises adjusting the transmit and receive baseband phase errors based on controlling a cut-off frequency and a phase shift of one or more baseband filters in the transmit and receive signal paths.

34. The method of claim 28 wherein the adjusting step comprises adjusting the transmit and receive carrier phase errors based on adjusting a relative phase of an in-phase component of a first carrier signal used for modulation in the transmit signal path to a quadrature component of the first carrier signal and a relative phase of an in-phase component of a second carrier signal used for demodulation in the receive signal path to a quadrature component of the second carrier signal.

35. The method of claim 23 wherein the test signals have essentially the same amplitude and frequency and have a phase difference of essentially ninety degrees.

36. The method of claim 23 wherein the series of measurements are made at a point following a demodulator in the receive signal path.

37. The method of claim 23 wherein the adjusting step comprises adjusting one or more control inputs of the transmit and receive signal paths.

38. The method of claim 23 wherein providing the test signals comprises applying the test signals to a point preceding the modulator in the transmit path.

* * * * *